United States Patent [19]
Palma et al.

[11] Patent Number: 5,179,563
[45] Date of Patent: Jan. 12, 1993

[54] LINEAR POLARIZATION CONTROL OF HIGH POWER LASERS

[75] Inventors: Gary E. Palma, Bloomfield; Sallie S. Townsend, Manchester; Aristotle Parasco, Bolton; John A. Benda, Amston, all of Conn.

[73] Assignee: United Technologies Corporation, Hartford, Conn.

[21] Appl. No.: 781,427

[22] Filed: Oct. 23, 1991

[51] Int. Cl.$^5$ ............................................... H01S 3/10
[52] U.S. Cl. ........................................ 372/27; 372/95; 372/94
[58] Field of Search ........................... 372/95, 94, 27

[56] References Cited

U.S. PATENT DOCUMENTS

| | | | |
|---|---|---|---|
| 4,669,088 | 5/1987 | Waite | 372/95 |
| 4,682,339 | 7/1987 | Sziklas et al. | 372/94 |
| 4,792,765 | 12/1988 | Smith et al. | 372/95 |
| 4,841,541 | 6/1989 | Sziklas et al. | 372/94 |

Primary Examiner—Georgia Y. Epps

[57] ABSTRACT

An unstable laser resonator is controlled in polarization by the use of a control leg coupled to the parent resonator and having a polarization control element therein, so that control of a low power beam in said control leg serves to control the polarization of the parent resonator.

14 Claims, 3 Drawing Sheets

LINEAR POLARIZATION CONTROL OF HIGH POWER LASERS

CROSS REFERENCE TO RELATED APPLICATIONS

This application is related to the subject matter disclosed and claimed in copending U.S. Ser. No. 07/781771 entitled A HIGH POWERED LASER WITH REDUCED OPTICAL ABERRATION by P. R. Blaszuk;

U.S. Ser. No. 07/780897 entitled A HIGH POWER LASER HAVING STAGED LASER ADJOINT PULSED FEEDBACK by S. S. Townsend, P. R. Cunningham and J. S. Foley;

U.S. Ser. No. 07/780637 entitled OPTICALLY PULSED LASER HAVING COUPLED ADJOINT BEAMS by J. A. Benda;

U.S. Ser. No. 07/780898 entitled A MODE-LOCKED HIGH POWER LASER HAVING AN ADJOINT FEEDBACK BEAM by J. A. Benda, P. R. Blaszuk and G. E. Palma;

U.S. Ser. No. 07/781431 entitled PULSED RING LASERS USING ADJOINT COUPLING CONTROL by G. E. Palma and J. A. Benda;

U.S. Ser. No. 07/781430 entitled OPTICALLY PULSED LASER by J. A. Benda, P. R. Blaszuk, G. E. Palma and D. C. Smith;

U.S. Ser. No. 07/781426 entitled LINEAR POLARIZATION CONTROL OF HIGH POWER LASERS by J. A. Benda, P. R. Blaszuk, J. Forgham and H. L. Cohen;

U.S. Ser. No. 07/781428 entitled CIRCULAR AND ELLIPTICAL POLARIZATION OF A HIGH POWER LASER BY ADJOINT FEEDBACK by J. A. Benda and P. R. Blaszuk filed on even date herewith and assigned to the same assignee herein incorporated by reference.

TECHNICAL FIELD

The field of the invention is that of the polarization control of high power lasers having an output mode that is magnifying in space and an adjoint mode that is demagnifying on each round trip in the resonator.

BACKGROUND ART

U.S. Pat. No. 4,682,339, assigned to the assignee hereof, illustrates a method of coupling standing wave lasers in which two modes exist in the resonator, one magnifying as it circulates in the resonator and the other demagnifying. A portion of the output beam is sampled and injected back into the resonator mode-matched to the demagnifying mode. U.S. Pat. No. 4,841,541, illustrates the use of adjoint coupling with unstable ring resonators. These disclosures relate to unpolarized lasers.

Disclosure of Invention

The invention relates to a method of controlling the polarization of a high power laser resonator in which the properties of the resonator itself are used to control polarization rather than control by use of a polarization discriminating element within the parent resonator.

A portion of the laser output beam is passed into an element that reflects it back into the resonator such that it is mode-matched to the adjoint mode and there is a 180° phase shift between two orthogonal linear polarizations. One polarization interferes constructively with the radiation circulating within the parent resonator, causing the laser to run with that polarization. Polarization control can be done without transmissive or coated optics.

Other features and advantages will be apparent from the specification and claims and from the accompanying drawings which illustrate an embodiment of the invention.

BEST MODE FOR CARRYING OUT THE INVENTION

Figure 1:
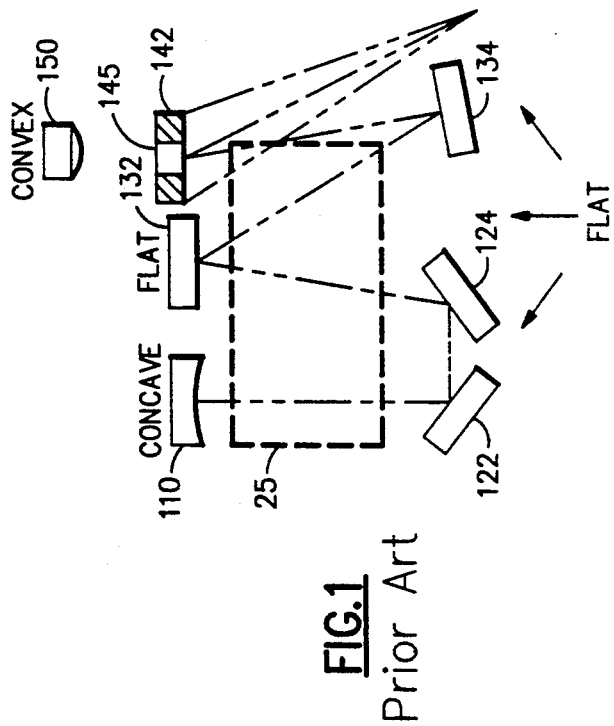
FIG. 1 illustrates a prior art polarized laser system.

Referring now to FIG. 1, there is shown a prior art laser resonator 100 in which a gain medium 25 amplifies laser radiation that is passing between concave mirror 110 and convex mirror 150. Four intermediate mirrors 122, 124 and 132, 134 serve to reflect the beam through gain medium 25 a number of times. The purpose of mirrors 122 and 124 (oriented perpendicular to the plane of the paper) is to control the polarization state of the resonated radiation to suppress polarization having its axis in the plane of the paper. The mechanism is that there is a slight difference in the reflectivity of the mirrors for polarization perpendicular and parallel to the plane of the paper that is sufficient to suppress the undesired mode. It would be difficult to put other types of polarizing discriminating elements into main resonator of a high power laser, such as thin film polarizers or Brewster angle windows, because of the high flux that would result on such elements. A conventional output mirror 142 having aperture 145 is used to deflect output beam 70.

A difficulty that has interfered with progress in the art is that it has been difficult to achieve satisfactory control of the polarization of high power lasers. The usual methods employed with low power lasers are not feasible with high power and workers in the art have had to make do with unsatisfactory substitutes such as a pair of orthogonal mirrors located in the cavity. A drawback of this approach is that the two mirrors 122, 124 take up extra space which is always in short supply. In addition, since the polarization control elements are within the laser resonator, they are sensitive and may not be adjusted easily.

Figure 2:
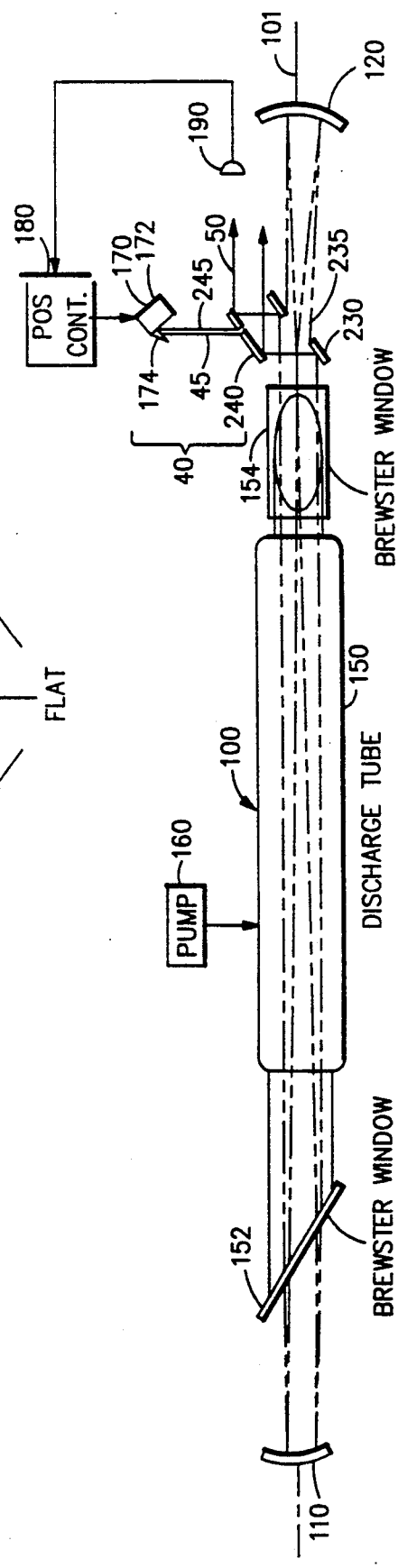
FIG. 2 illustrates a standing wave unstable resonator system employing the invention.

Referring now to FIG. 2, there is shown an embodiment of the invention in which a parent laser resonator cavity 100 is bounded by mirrors 110 and 120, forming a confocal standing wave unstable resonator. Brewster windows 152 and 154 confine a $CO_2$ gain medium pumped by DC power supply 160. Preferably, embodiments of the invention do not use Brewster angle windows. For high power embodiments, no windows in the resonator are preferred. Normally if Brewster angle windows are present, they are oriented in the same direction and will polarize the laser without any additional help. In this embodiment, which runs at low power, the Brewster angle windows were oriented perpendicular to each other so that their polarization discrimination would cancel. An output beam 50 is deflected by scraper mirror 230, having an aperture 235 for the circulating power. A turning mirror 240 deflects output beam 50 and permits the passage of feedback beam 45 through feedback aperture 245. Beam 45 is reflected back into resonator 100 by roof mirrors 170 comprising two uncoated mirrors 172 and 174 positioned at right angles With respect to one another and at an angle of 45° with respect to beam 45. Preferably, the center of beam 45 intersects the line of intersection of the two roof mirrors, so that the beam is symmetrically reflected. The reflection process interchanges the portion of the beam that strikes mirror 172 with the portion of the beam that strikes mirror 174.

Those skilled in the art will understand that the return beam 45 will have a polarization state that is divided into two linear polarization components. The polarization parallel to the axis of mirror 170, defined here to means the line of intersection of the two roof mirror 172 and 174, Will be reflected With no phase shift, while the polarization perpendicular to the axis undergoes a 180° phase shift. Upon its return to resonator 100, one polarization component will interfere with the circulating radiation constructively and the other component will interfere destructively. Those skilled in the art will readily be able to devise other apparatus that will shift the phase of one linear polarization component with respect to the other. Because of the "leverage" of the adjoint feedback, this differential interference of even a small amount of feedback power will control the polarization of resonator 100. The position of roof mirror 170 is controlled by position controller 180, illustratively a piezoelectric actuator controlled by a general purpose digital computer that is responsive to detector 190, which monitors the polarization state of the output beam by measuring the power that passes through polarization analyzer 192. Mirror 170 will be maintained in position through this active position control to keep the output beam in the desired polarization state. The roof mirror assembly 170 can be rotated about the axis of beam 45 to rotate the polarization of the output beam.

An experimental test on a resonator having the parameters: $M = -2.67$, $L = 2.75m$, $a = 3.5$ mm, $a_c = 2.0$ mm, and $N_{eq} = \infty$, where M is the magnification, L is the length of the parent resonator consisting of mirror 110, 120 and 235, a is the radius of aperture 235, $a_c$ is the radius of feedback aperture 245, and $N_{eq}$ is the equivalent Fresnel number of the resonator, confirmed that the polarization of output beam 50 reversed when the cavity length changed by one quarter of a wavelength.

Figure 3:
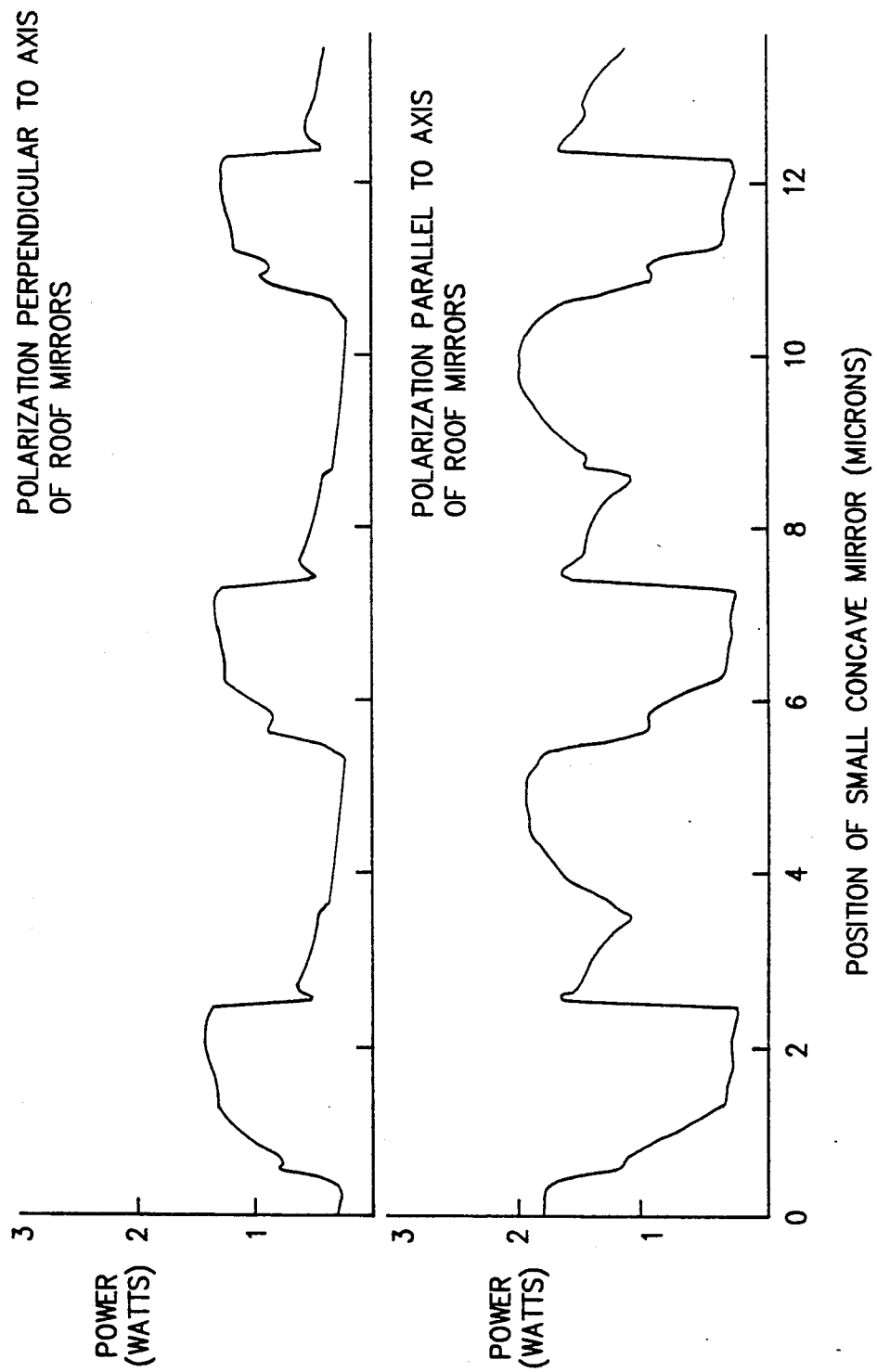
FIG. 3 illustrates experimental results of the embodiment of FIG. 2.

This is expected since the polarization of the adjoint feedback beam that will interfere constructively with the radiation circulating in the parent resonator changes after each quarter length change of cavity length. The experimental setup, shown in FIG. 2, uses a low power $CO_2$ laser. The Brewster angle windows on the discharge tube were oriented perpendicular to each other to minimize their polarization discrimination. A polarization analyzer was placed in the output and the power in each polarization was monitored by two thermopile detectors omitted from the drawing. The small concave mirror 120 in the main resonator was moved continuously and its position monitored with a probe. Movement of the small concave mirror is essentially equivalent to moving the two roof mirrors, since a position shift of this mirror results in a change in axial mode frequency which changes the optical path length of the optical feedback leg 40. A data acquisition system recorded the readings from the detectors and the position probe simultaneously. The results for both polarizations are shown in FIG. 3. One finds from FIG. 3 that the polarization switches to the orthogonal orientation every quarter wavelength of mirror movement. The ratio of one polarization to the other was at least five to one. The actual ratio may have been higher because the thermopile detectors initially react to changes quickly, but fall short of the new reading and take several seconds to reach it.

Figure 4:
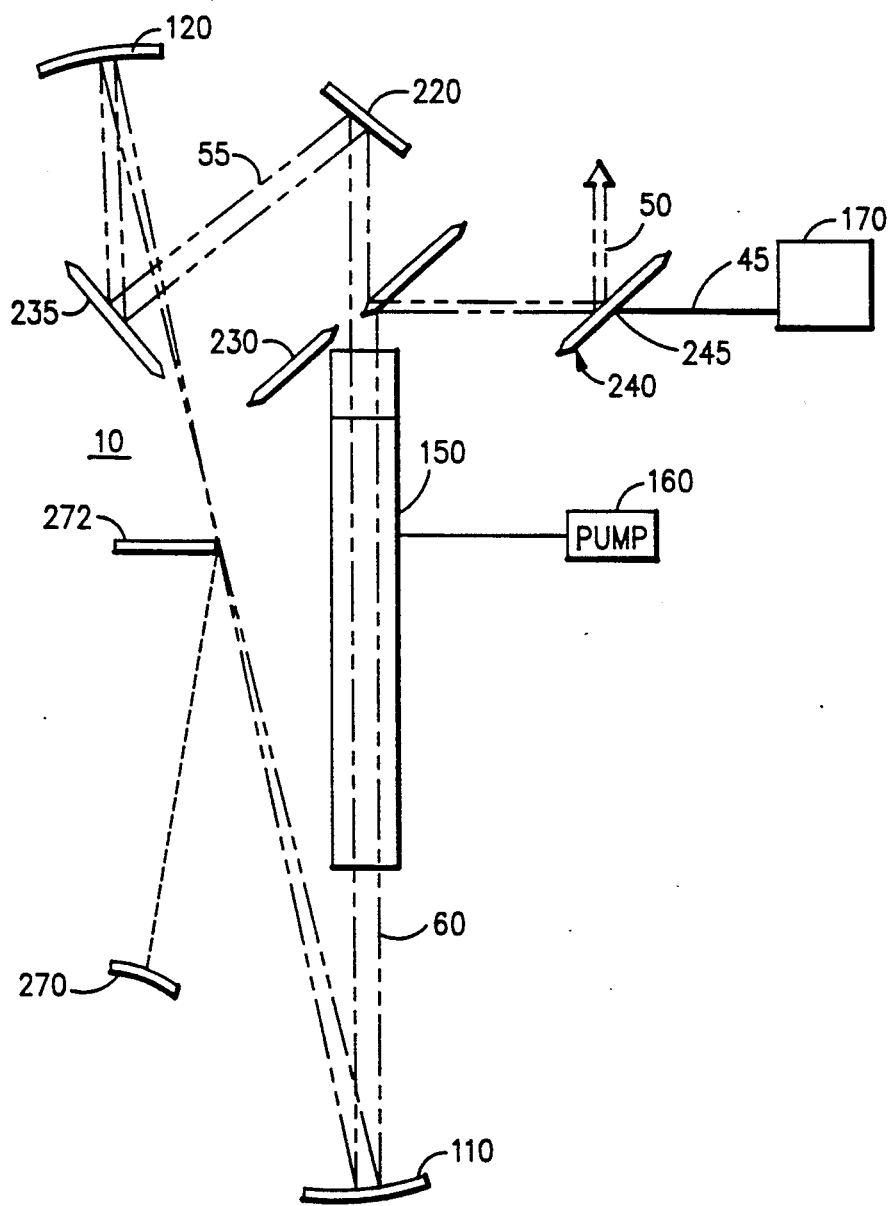
FIG. 4 illustrates a ring laser system employing the invention.

Those skilled in the art may readily devise other embodiments of the invention. In general, the output feedback aperture and the return aperture need not be the same, though the embodiment of FIG. 2 uses a single aperture. The feedback aperture need not be placed on the output mirror. The resonator need not be a confocal standing wave resonator as illustrated in FIG. 2. Ring lasers could also be used, as disclosed in FIG. 4 in which a ring resonator laser, indicated collectively by the numeral 10, has a collimated section having a gain medium 150 controlled by a DC power supply 160 and a confocal magnifying section having two concave mirrors 110 and 120 and a reverse wave suppressor comprising mirrors 270 and 272 that couple the reverse wave to the forward wave as taught in U.S. Pat. No. 4,841,541, incorporated herein by reference. An output mirror 230 deflects output beam 50 from the circulating beam 60 and permits passage of a feedback beam 45 through aperture 245 of turning mirror 240. Turning mirrors 220 and 535 transport beam 55 to an appropriate angle to be fed back into feedback mirror 120. Feedback beam 45 is modulated by polarization modulator 170 as in the embodiment of FIG. 2. The invention will work best when there is no polarization control built into the parent ring resonator, such as a planar ring with an even number of mirrors. Any type of power supply or pumping means can be used: optical pumping, electrical pumping by means of a DC or pulsed power supply or by an RF power supply can all be used with the invention. In the ring embodiment illustrated, the power fed back is in the adjoint mode of the forward wave, which has the same radial structure as the forward wave but travels in the opposite direction. This radiation couples to the reverse wave and is then coupled again to the forward wave. Power could also be fed back mode-matched to the adjoint mode of the reverse wave, with suitable optics.

For all embodiments of the invention, feedback beam 45 is reflected back into resonator 100 in a particular configuration of direction and phase distribution such that it is mode matched to the demagnifying adjoint mode of the resonator. A definition of adjoint mode is given in "Orthogonality Properties of Optical Resonator Eigenmodes", by A. E. Siegman, Optics Comm., Vol. 31, pp. 369–373, Dec. 1979. This causes the reflected radiation to converge down into the axis of the resonator, before diffractively spreading and expanding out from the resonator axis as it is reflected between mirrors 110 and 120. The effect of this is to reduce the resonator loss (by increasing the system feedback) more than by other means of injecting the feedback beam, thus allowing a low power beam to have a large effect.

In the example shown, the output radiation is collimated, so the output beam is simply reflected with a flat mirror. In general, for non-collimated output, a curved mirror will be necessary to mode match the adjoint mode of the resonator.

The "leverage" effect from the use of adjoint feedback rather than non-adjoint feedback results from the fact that in this type of unstable resonator the adjoint beam is demagnifying down to the resonator axis 101, so that the radiation fed back in from adjoint beam 45 makes several passes as it "walks" or converges down to axis 101 before it spreads diffractively and contributes to the resonator losses or outputs. The adjoint feedback power thus makes many more passes through the gain medium than non-adjoint feedback power would before a significant amount of it is lost.

It has been discovered that a feedback aperture have an area only about 0.1% of the area of (or intercepting about 0.1% of the output power) can have a noticeable effect on the output beam, in particular, on the phase and intensity distribution. This can be viewed as a consequence of the fact that the composite resonator will have different modes than the parent resonator. If the feedback hole is made too large, serious beam quality degradation can occur compared with the beam quality associated with the parent resonator. Beam quality is calculated conventionally as a measure of the deviation of the focal spot size of the actual focused output beam from diffraction-limited. Beam quality, as well as the impact on polarization discrimination, has been calculated to be a function of the radial position of aperture 145, with a position close to the center being slightly preferred.

In addition, there is a range of feedback aperture diameters for preferred operation. If the diameter of the feedback aperture is d, the limiting diameter of the resonator (mirror or gain medium) is D, and the distance between them is L', then there will be a significant loss of feedback power when $2\lambda L'/d > D$, i.e. $d > 2\lambda L'/D$ is preferred. The phase perturbations discussed above set a limit on the maximum diameter that can be tolerated for aperture 145. Thus, d should be between a lower bound, or threshold diameter, set by the diffraction limit and an upper bound, or upper diameter limit, set by the beam quality. The lower bound may be set by the requirement that the feedback power be above a threshold power great enough to increase the gain above threshold or it may be set by a requirement that a threshold amount of feedback power is required for reliable polarization control. Which of the two bounds is the limiting factor will depend on the details of the resonator design. Other parameters of the system may be varied, such as placing a smaller aperture in a more intense portion of the output radiation, so that the optimum design trade off will depend on the design of the parent resonator and the required beam quality ($2\times$ diffraction limited, $4\times$—, etc.). Additionally, decreased magnification will produce greater intensity and so permit the use of a smaller feedback aperture.

It has been observed that backscatter from the workpiece in welding operations tends to depolarize the parent resonator, so that a greater amount of feedback power may be required in such applications, at the cost, of course, of decreased beam quality resulting from the different mode structure of the compound resonator.

It should be understood that the invention is not limited to the particular embodiments shown and described herein, but that various changes and modifications may be made without departing from the spirit and scope of this novel concept as defined by the following claims.

We claim:

1. A laser system comprising a standing wave unstable parent laser resonator having a gain medium, pump means for producing a population inversion in said gain medium, mirror means disposed along an axis for directing optical radiation through said gain medium in a magnifying output mode and a demagnifying adjoint mode, having a parent resonator magnification, a parent resonator feedback value, and further having output means for directing an output beam out of said unstable resonator, comprising;

adjoint feedback means having at least one feedback aperture disposed to intercept radiation in said magnifying output mode, whereby a portion of said radiation in said magnifying output mode passes through said at least one feedback aperture as an output feedback beam, and for passing through a return feedback aperture of said at least one feedback aperture an adjoint mode feedback beam in said demagnifying adjoint mode;

said adjoint feedback means includes adjoint feedback reflection and polarization means for receiving said output feedback beam passed through said feedback aperture and for feeding back through said return feedback aperture said adjoint mode feedback beam having a predetermined polarization state and a predetermined amount of feedback power in said demagnifying adjoint mode, whereby radiation in said output mode in said parent resonator is coupled to said adjoint mode in said parent resonator through the passing of said adjoint mode feedback beam through said return feedback aperture with an amount of feedback power above a predetermined threshold amount of feedback power, and said laser system comprises a compound resonator including said parent laser resonator and a resonator control leg comprising said adjoint feedback reflection and polarization means for shifting the phase of one orthogonal polarization state of said adjoint mode feedback beam by 180° with respect to a second orthogonal polarization state of said adjoint mode feedback beam, so that said adjoint mode feedback beam is fed back into said parent resonator with a predetermined phase and said resonator control leg controls the polarization of said parent laser resonator.

2. A laser system according to claim 1, in which said parent resonator is a confocal standing wave unstable resonator.

3. A laser system according to claim 1, in which said feedback aperture has a diameter greater than a threshold diameter that passes said predetermined feedback threshold amount of feedback power and less than a predetermined upper diameter limit determined by a desired beam quality.

4. A laser system according to claim 1, in which said beam polarization means is rotatably mounted about a feedback beam axis of said adjoint mode feedback beam, so that said linear polarization state has a variable azimuthal angle about said feedback beam axis.

5. A laser system according to claim 2, in which said beam polarization means is rotatably mounted about a feedback beam axis of said adjoint mode feedback beam, so that said linear polarization state has a variable azimuthal angle about said feedback beam axis.

6. A laser system according to claim 3, in which said beam polarization means is rotatably mounted about a feedback beam axis of said adjoint mode feedback beam, so that said linear polarization state has a variable azimuthal angle about said feedback beam axis.

7. A laser system according to claim 4, in which said gain medium is $CO_2$.

8. A laser system according to claim 5, in which said gain medium is $CO_2$.

9. A laser system according to claim 6, in which said gain medium is $CO_2$.

10. A laser system according to claim 1, in which said parent resonator is a ring unstable resonator.

11. A laser system according to claim 10, in which said feedback aperture has a diameter greater than a threshold diameter that passes said predetermined feedback threshold amount of feedback power and less than a predetermined upper diameter limit determined by a desired beam quality.

12. A laser system according to claim 11, in which said beam polarization means is rotatably mounted about a feedback beam axis of said adjoint mode feedback beam, so that said linear polarization state has a variable azimuthal angle about said feedback beam axis.

13. A laser system according to claim 11, in which said gain medium is $CO_2$.

14. A laser system according to claim 12, in which said gain medium is $CO_2$.

* * * * *